(12) United States Patent
Nam et al.

(10) Patent No.: US 8,779,046 B2
(45) Date of Patent: Jul. 15, 2014

(54) POLYMER COMPOSITION WITH UNIFORMLY DISTRIBUTED NANO-SIZED INORGANIC PARTICLES

(75) Inventors: Pham H. Nam, Shizuoka (JP); Jeong Chang Lee, Shizuoka (JP)

(73) Assignee: Dupont Mitsui Fluorochemicals Co Ltd

( * ) Notice: Subject to any disclaimer, the term of this patent is extended or adjusted under 35 U.S.C. 154(b) by 605 days.

(21) Appl. No.: 12/824,451

(22) Filed: Jun. 28, 2010

(65) Prior Publication Data

US 2010/0261809 A1  Oct. 14, 2010

Related U.S. Application Data

(63) Continuation of application No. 11/540,871, filed on Sep. 29, 2006, now abandoned.

(30) Foreign Application Priority Data

Sep. 30, 2005 (JP) ................................. 2005-287314

(51) Int. Cl.
*C08C 1/14* (2006.01)
*C08K 3/36* (2006.01)
*C08K 3/22* (2006.01)
*C08K 3/00* (2006.01)

(52) U.S. Cl.
CPC ............. *C08K 3/2279* (2013.01); *C08K 3/0008* (2013.01); *C08K 3/22* (2013.01); *C08K 3/36* (2013.01)
USPC ............................ 524/410; 524/492; 523/335

(58) Field of Classification Search
USPC .................. 248/403; 260/29.6, 132; 427/212; 428/336, 402, 404, 407, 421, 422; 523/333, 335; 524/265.269, 333, 430, 524/432, 442, 444, 445, 462, 463, 492, 493, 524/495, 544, 410; 525/330; 526/245, 246, 526/247, 255; 528/401
See application file for complete search history.

(56) References Cited

U.S. PATENT DOCUMENTS

| | | | |
|---|---|---|---|
| 2,995,534 A | 8/1961 | Adams et al. | |
| 3,947,376 A * | 3/1976 | Albrecht | 516/81 |
| 4,038,244 A * | 7/1977 | Ogden et al. | 524/142 |
| 4,262,101 A * | 4/1981 | Hartwimmer et al. | 526/89 |
| 4,675,380 A | 6/1987 | Buckmaster et al. | |
| 5,919,878 A * | 7/1999 | Brothers et al. | 526/247 |
| RE37,022 E | 1/2001 | Sugiyama et al. | |
| 6,350,806 B1 | 2/2002 | Tsuda et al. | |
| 2002/0165305 A1 | 11/2002 | Knudson, Jr. et al. | |
| 2003/0228463 A1 * | 12/2003 | Abusleme et al. | 428/402 |
| 2005/0123739 A1 | 6/2005 | Chen-Yang et al. | |

FOREIGN PATENT DOCUMENTS

| | | |
|---|---|---|
| JP | 04-202329 | 7/1992 |
| WO | 03078315 A2 | 9/2003 |
| WO | 2005084955 A1 | 9/2005 |

OTHER PUBLICATIONS

Abstract of JP 408120210A, Published May 14, 1996.*
Kunio Furusawa et al, "Heterocoagulation Behaviour of Polymer Latices With Spherical Silica", Colloids and Surfaces, 63 (1992) 103-111.
Hirose, M. et al, "Organic/Inorganic Nanocomposite Obtained by Crushing and Dispersing Porous Silica", Edited by Powder Engineering Association: Powder Engineering Handbook—Second Version, p. 291-294 (1986).
Homola, A. et al, "Preparation and Characterization of Amphoteric Polystyrene Latices", Journal of Colloid and Interface Science, vol. 59, No. 1, Mar. 15, 1977.
Wang, H. et al, Polyimide/Silica/Titania Nanohybrides Via a Novel Non-Hydrolytic Sol-Gel Route, Composites Part A: Applied Science and Manufacturing, Elsevier Science Publishers B.V., Jul. 2005, pp. 909-914, vol. 36, No. 7, Amsterdam, NL.
Gellermann C. et al, "Functionalisierte Nanopartikel—Nur Als Fuellstoff Geeignet?", Gummi, Fasern, Kunststoffe. Internationale Fachzeitschrift Fur Die Polymer-Verarbeitung, Gentner Verlag, Stuttgart, DE, vol. 53, No. 10, Oct. 2000, pp. 712-717.

* cited by examiner

*Primary Examiner* — Ling Choi
*Assistant Examiner* — Chun-Cheng Wang
(74) *Attorney, Agent, or Firm* — Keith W. Palmer

(57) ABSTRACT

A polymer composition is disclosed wherein inorganic particles are uniformly dispersed at the nano level in a polymer without having the inorganic particles being surface-treated. Further disclosed is a method for manufacturing a polymer composition wherein a co-aggregate which is obtained by uniformly mixing polymer dispersion with an inorganic particle colloidal solution and co-aggregating the polymer primary particles and inorganic particles which are heterogeneous particles, is separated from the solvent and dried so that the inorganic particles are uniformly dispersed at the nano level in the polymer.

7 Claims, 3 Drawing Sheets

POLYMER COMPOSITION WITH UNIFORMLY DISTRIBUTED NANO-SIZED INORGANIC PARTICLES

FIELD OF INVENTION

The present invention relates to a polymer composition wherein inorganic particles are uniformly dispersed at the nano level in a polymer and to a method for manufacturing said polymer composition.

BACKGROUND OF THE INVENTION

A conventional means for improving the properties such as mechanical strength, dimensional stability, and compression creep resistance of polymers has been to combine a filler with polymer. However, the uniformity with which filler distributed in the polymer is not completely specified.

Recently, methods have been developed to improve the mechanical strength, heat deformation temperature and dimensional stability of polymer by direct melt blending of nano particles such as inorganic nano particles into the polymer. However, when inorganic particles are melt-mixed with polymer, the mutual cohesive force of the particles is found to increase as particle diameter is decreased and the inorganic particles tend to aggregate, that is, the inorganic particles cluster together, especially at when the particles are at the nano level in size, i.e. about 1 to 1000 nm in diameter. Therefore, even when the nano particles are directly melt-mixed with the polymer, it is extremely difficult to disperse the particles at the nano level in the polymer (Powder Body Engineering Handbook, 2nd Edition, p. 291-294, 1983, as reported in the Proceedings of the 47th Meeting of the Japan Society of Materials Science, Kyoto, Oct. 29-30, 2003, pp. 150-151).

One approach to overcoming the problems of the above described direct melt-mixing method, is a solution-mixing method wherein a colloidal solution of stably dispersed inorganic particles is mixed with a functionalized polymer dissolved in a liquid. For example, U.S. Pat. No. RE37,022 proposes a composition (coating agent) wherein perfluoropolymer is dissolved in an organosol wherein inorganic particles with an average particle diameter of 1000 nm or less, treated with fluorine-containing surfactant, are dispersed in a fluorinated solvent having no hydrogen (that is, the solvent has no hydrogen atoms bonded to the multivalent atoms of the solvent molecule) or a solvent made by mixing said solvent with a fluorinated solvent that contains hydrogen. The use of functionalized fluoropolymer and fluorinated solvents make this an expensive and inconvenient approach, suitable only for specialized applications.

U.S. Pat. No. 6,350,806 is directed to water-based paint, which is cured at up to 300° C., made of aqueous fluoropolymer dispersion which is added to aqueous-emulsified acrylate and methacrylate monomer, which are then polymerized. To the resulting polymer dispersion is mixed dry colloidal silica that is been treated with organoalkoxysilane. In the absence of the organoalkoxysilane, the silica is not stably mixed and the paint lacks storage stability. The distribution of the treated silica particles in the dried paint coating is not disclosed. Being a paint, the composition is not suitable for compression molded, extrusion molded, or injection molded articles. In view of the substantial acrylic content, 30 parts acrylate to 100 parts fluoropolymer, the resulting polymer composition lacks the thermal properties and oxidative resistance characteristic of fluoropolymers.

Another approach to the above described direct melt-mixing method is reported in Colloid and Surfaces, vol. 63, p. 103-111, 1992 wherein it is disclosed that aggregate is created from the solution made from mixing heterogeneous particles, wherein a colloidal silica to which potassium chloride is added so that the pH value is 5.6, is mixed with polystyrene emulsion in which the polystyrene is a copolymer that includes comonomers that provide acid and base functionality whereby the polymer is amphoteric. The silica and polystyrene particles have opposite electrical charge and thus form an unstable mixture, wherein slight mixing causes the particles to form heterocoagulates. This reference requires that the ratio of the diameter of the silica primary particles to that of the polymer primary particles be 3 or more to obtain the proper aggregate composed of a relatively large silica core and small amphoteric-modified polystyrene particles clustered around the core. These aggregates are disclosed to be useful as functional particles in industrial fields.

U.S. Patent Application Publication No. 2005/0123739 discloses dispersing dry mesoporous hydrophobic-modified fused silica into polytetrafluoroethylene dispersion, which is then coagulated, and the liquid drained, and the coagulate dried at 130° C., followed by calendering into sheet form, and sintering to improve electrical properties as printed circuit substrates.

Japanese published examined application No. Hei 7-64936 proposes a method for obtaining a powder with an average particle diameter of 3 mm wherein a suspension of silicon carbide particles with an average particle diameter of 4000 nm that has been surface-treated with an aminosilane group surfactant, is added to a fluoropolymer dispersion. Then nitric acid is added to the mixture to break the emulsion and after that, trichlorotrifluoroethane is added to the mixture to coagulate and granulate the particles thereby obtaining an powder with an average particle diameter of 3 mm.

None of the above-mentioned teachings solve the problem of providing a molded article of filled polymer where the filler is nano-sized and is uniformly dispersed as such in the polymer.

SUMMARY OF THE INVENTION

The present invention solves this problem by the method of manufacturing the polymer composition, comprising mixing aqueous polymer dispersion comprising polymer primary particles with aqueous colloidal solution of inorganic particles having an average particle diameter of 1 to 1000 nm, coagulating the resultant mixture to make a co-aggregate of the particles, separating said co-aggregate from the aqueous media of said solution, and drying the coaggregate.

In a preferred method, a polymer dispersion is formed, wherein the polymer primary particles are surrounded by a surfactant (which may hereinafter be called emulsifying agent) and stably dispersed in the aqueous medium in the course of emulsion polymerization, is mixed with an aqueous colloidal solution (which may hereinafter be called an inorganic particle sol). Then, after the polymer primary particles are uniformly mixed with the inorganic particles in the mixed aqueous media, the resultant mixture is coagulated so that the uniformly mixed polymer primary particles and inorganic particles are solidified, i.e., co-aggregated, to distinguish from aggregates of primary polymer particles with each other, and aggregates of inorganic particles with each other. Then, by separating the co-aggregate from the aqueous phase and drying, dried co-aggregate of the inorganic particles dispersed at the nano level in the polymer is obtained. The mixture of the inorganic particle sol with the stably dispersed polymer primary particles results in the inorganic particles also being stably dispersed at the nano level in admixture with the polymer primary particles.

After the polymer primary particles and inorganic particles are uniformly mixed, the resulting mixture is subject to coagulation by such techniques a vigorous mechanical mixing (a strong shearing force), by adding electrolyte to the mixture, or by freezing the mixture (dispersion). In this way, the stability of the dispersed admixture of the polymer particles and of the inorganic particles is decreased thereby coagulating the particles together. As a result, the uniformly mixed polymer primary particles and inorganic particles are solidified. Then, by separating the co-aggregate from the aqueous medium and drying the co-aggregate, the polymer composition is obtained wherein the inorganic particles are uniformly dispersed at the nano level with the primary particles of the polymer. On melting, compression molding, or sintering of the polymer, a composition is obtained wherein inorganic particles are uniformly dispersed in the polymer at the nano level, i.e. the inorganic particles are of nano dimensions (1000 nm and smaller in particle size) in the polymer matrix. Therefore, the present invention can be used in a variety of fields that require inorganic particles to be uniformly dispersed at the nano level in a polymer matrix.

Another preferred embodiment of the present invention is the polymer composition derived from this method wherein inorganic particles are uniformly dispersed at the nano level in the polymer. By derived is meant directly obtained from the method, i.e. the co-aggregates, or indirectly obtained by processing of the co-aggregates, to make e.g. granules, pellets, or molded articles such as by compression molding or melt mixing fabrication.

A preferred embodiment of the present invention is the granulated powder which is obtained by granulating the polymer composition.

A preferred embodiment of the present invention is the pellet which can be obtained by melt-mixing in the course of extruding the polymer composition or of the granulated powder of the polymer composition.

Another preferred embodiment of the present invention is the composition obtained by melt-mixing the polymer composition derived by mixing polymer dispersion comprising polymer primary particles with the colloidal solution of inorganic articles, coagulating the resultant mixture to make a co-aggregate of the polymer primary articles with said inorganic particles, separating said co-aggregate, and drying said co-aggregate. The co-aggregate can be melt processed as such or after granulation or pelletization thereof. The melt mixing can also be applied to the co-aggregate, granules, or pellets thereof. Compression molding is preferably carried out with the co-aggregates or granules thereof.

DETAILED DESCRIPTION OF THE INVENTION

Figure 1:
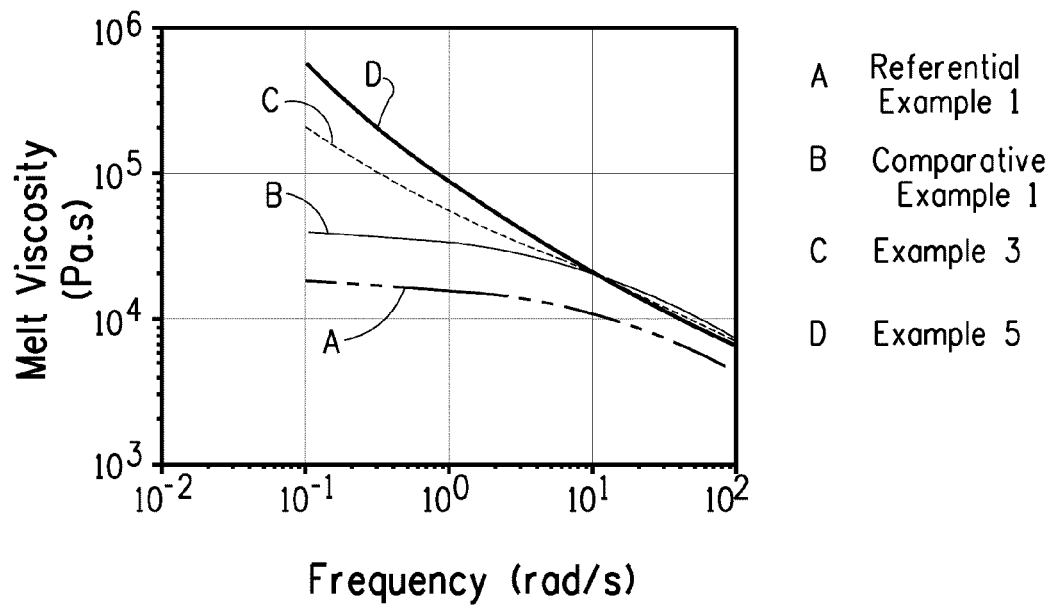
FIG. 1 is a graph of the measurement of the zero shear rate viscosity of polymer compositions containing 20 wt % of silica.

The present invention provides a polymer composition wherein inorganic particles are uniformly dispersed at the nano level in the polymer and a method for manufacturing said polymer composition. The polymer dispersion used in the present invention is not limited to a specific dispersion and any polymer dispersion can be used. Fluoropolymers are the preferred polymers. Examples of fluoropolymer dispersions include polymer or copolymer of the monomers selected from tetrafluoroethylene (TFE), chlorotrifluoroethylene (CTFE), trifluoroethylene, hexafluoropropylene (HFP), perfluoro(alkyl vinyl ether) (PAVE), which includes perfluoro (methyl vinyl ether) (PMVE), perfluoro(ethyl vinyl ether) (PEVE), perfluoro(propyl vinyl ether) (PPVE), vinylidene fluoride (VdF or VF2)) and vinyl fluoride (VF), or a copolymers of the above monomers with ethylene or propylene.

Examples of the fluoropolymer dispersion include polytetrafluoroethylene (hereinafter called PTFE), TFE/PAVE copolymer (which hereinafter may be called PFA, a species of which is sometimes called PMA if PMVE is among the monomers used), tetrafluoroethylene/ethylene copolymer (ETFE), polyvinylidene fluoride (PVDF), polychlorotrifluoroethylene (PCTFE), chlorotrifluoroethylene/ethylene copolymer (ECTFE), TFE/VdF copolymer, TFE/VF copolymer, TFE/HFP/VF copolymer, HFP/VdF copolymer, VdF/CTFE copolymer, TFE/VdF/CTFE copolymer and TFE/HFP/VdF copolymer.

Among them, in the copolymer of tetrafluoroethylene and perfluoro(alkyl vinyl ether), the number of carbons of alkyl group is preferably 1 to 5, or more preferably, 1 to 3. It is preferable that the dispersion of the above described polymers and copolymers is manufactured by emulsion polymerization.

According to the present invention, polymer dispersion wherein the polymer primary particles are surrounded by a surfactant and stably dispersed in the dispersing liquid in the course of emulsion polymerization, is mixed with a colloidal solution wherein inorganic particles are stably dispersed and the polymer primary particles are thereby uniformly mixed with the inorganic particles. This mixture is stable since while the polymer primary particles and the inorganic particles are interdispersed within the aqueous medium derived from the aqueous dispersion and the colloid, these particles are not attracted to one another to cause aggregation. The mixing and coagulation steps, the latter causing co-aggregation, are sequentially, not simultaneously carried out. To cause coagulation, the stability of the colloid solution is decreased, such as by shearing or other means disclosed herein. Therefore, it is possible to obtain a polymer composition wherein the inorganic particles and the polymer primary particles are uniformly dispersed at the nano level regardless of the chemical composition of the primary particles in the polymer dispersion. As a result, other than the above described fluoropolymer dispersion, it is possible to use many kinds of polymer dispersion, especially those obtainable by emulsion polymerization.

Polymer dispersions may be made by other methods, such as by melting the polymer and dispersing it, usually by mechanical action, such as high shear mixing, in a medium, such as water, usually with the aid of a surfactant (U.S. Pat. No. 2,995,533). Alternatively, polymer may be dissolved in a solvent, this solution dispersed in water with the aid of a surfactant, and then the solvent removed by evaporation or by stripping, such as with steam.

Examples of preferred non-fluorine-containing polymer dispersion include polystyrene (PS), poly(methyl methacrylate) (PMMA), poly(vinyl chloride) (PVC), polyisoprene, polybutadiene, styrene/butadiene copolymer (SBR), acrylonitrile/butadiene copolymer, methyl methacrylate/butadiene copolymer, 2-vinylpyridine/styrene/butadiene copolymer, acrylonitrile/butadiene/styrene copolymer, poly(vinyl acetate) (PVAc), and ethylene-vinyl acetate (EVAc).

The preferred particle diameter of the polymer primary particle in the polymer dispersion depends on the particle diameter of the inorganic particle in the colloid solution. For example, the average polymer primary particle will generally be 50 to 500 nm, and preferably, 70 to 300 nm.

The present invention uses colloidal solutions, also known as sols, wherein inorganic particles are stably dispersed. Examples of the inorganic particles of the sol include metals, including silica, and metal compounds such as metal oxides, nitrides, zirconates silicates, antimonates, titanates, and hydroxides. It is preferable to use silicon oxide ($SiO_2$), titanium oxide ($TiO_2$), zeolite, zirconium oxide ($ZrO_2$), alumina ($Al_2O_3$), and zinc antimonate ($ZnSb_2O_6$). These materials may be used singly, or in combination of two or more. Examples of the other suitable particles include silicon carbide (SiC), aluminum nitride (AlN), silicon nitride ($Si_3N_4$), barium titanate ($BaTiO_3$), boron nitride, lead oxide, tin oxide, chrome oxide, chromium hydroxide, cobalt titanate, cerium oxide, magnesium oxide, cerium zirconate, calcium silicate, zirconium silicate, and transition metals, including gold, silver, and copper. The only limitation is that the particles be compatible with the components of the dispersion, such as the aqueous medium, and the composition. The most preferred inorganic particles are silicon oxide, titanium oxide, aluminum oxide, and zinc antimonate.

It is preferable that the inorganic particle sol of the present invention is stabilized in a liquid state by a variety of electrolyte and organic additives. For example, colloidal silica sol is a colloid solution wherein negatively-charged silicon oxide nano particles are dispersed in water with silanol hydroxyl groups present in the surface of the particles. The inorganic particles are hydrophilic and are not treated to make them porous.

The particle diameter of the inorganic particles of the sol normally averages 1 to 1000 nm, preferably, 5 to 500 nm, and more preferably, 10 to 300 nm. Generally, for ease of preparation, sols having inorganic particles with an average particle diameter of 5 to 500 nm are preferred. For best uniform dispersion of inorganic particles at the nano level, it is especially preferable to use inorganic particle sol having inorganic particles with an average particle diameter of 10 to 300 nm. The colloids used in the present invention, although containing inorganic particles, are considered to be solution because the sol, generally at the usual low concentration of the inorganic particles in the aqueous medium of the sol, has the transparency of water, i.e. the particles are not visible to the naked eye.

Any of the known methods for coagulating polymer dispersions may be used. For example after the polymer dispersion is mixed with the sol, the mixture may be subjected to strong shearing using a stirring device thereby coagulating the particles (physical coagulation). Another method of physical coagulation is the freeze-thaw method. The mixture is cooled sufficiently to freeze it. This destabilizes the dispersion so that on thawing, the coagulate, which is the co-aggregate of the invention, separates from the liquid. Also, there is a method wherein an electrolyte is added to the mixture so that the stability of the mixture of polymer dispersion or the inorganic particle colloid solution is decreased thereby causing coagulation (chemical or electrolyte coagulation). Among these methods, it is preferable to use the chemical coagulation method wherein an electrolyte such as nitric acid or inorganic salt is added to the mixture of polymer dispersion and inorganic particle sol so that the stability is decreased and the uniform mixture of the polymer primary particles and the inorganic particles is solidified thereby obtaining co-aggregate wherein inorganic particles and the primary polymer particles are uniformly dispersed.

There are a variety of electrolytes used for the chemical coagulation method depending on the type or ratio of the polymer primary particles or inorganic particles in the mixed solution before they are chemically coagulated. Examples of the electrolytes which are used to chemically coagulate fluoropolymer primary particles in a fluoropolymer aqueous dispersion include inorganic or organic compounds such as aqueous HCl, $H_2SO_4$, $HNO_3$, $H_3PO_4$, $Na_2SO_4$, and $MgCl_2$. Among the above described compounds, it is preferable to use compounds which can volatilize during the process of drying the co-aggregate which is later conducted, such as HCl, $HNO_3$ and also, $(NH_4)_2CO_3$, and ammonium carbonate.

Furthermore, other than the above described electrolytes, it is possible to use inorganic salts such alkali metal salt, alkaline earth metal salt, and ammonium salt, of nitric acid, hydrohalic acid, phosphoric acid, sulfuric acid, molybdic acid, sulfuric acid, and preferably, potassium bromide, potassium nitrate, potassium iodide (KI), ammonium molybdate, monobasic or dibasic sodium phosphate, ammonium bromide ($NH_4Br$), potassium chloride, calcium chloride, copper chloride and calcium nitrate. The above described electrolytes can be independently used or in combinations of two or more. By repeatedly eluting the resulting co-aggregate with pure water and then drying, it is possible to remove the inorganic salt from the co-aggregate.

It is preferable to use 1 to 50 wt %, more preferably 1 to 30 wt % of the above described electrolyte to the weight of the polymer, more preferably, 1.5 to 30 wt %. It is also preferable to use 0.01 wt % to 30 wt %, more preferably 0.02 wt % to 10 wt % of the above described electrolyte. Also, it is preferable to add the electrolyte in the form of an aqueous solution to the mixed solution of polymer dispersion and sol. If the amount of the electrolyte is too small, coagulation occurs gradually and incompletely. As a result, it may not be possible to solidify rapidly enough to ensure that the uniformly mixed state of the polymer primary particles and the inorganic particles will persist through coagulation so as to ensure a co-aggregate wherein the inorganic particles and primary polymer particles are uniformly mixed.

The device for mixing and coagulating the particles wherein the polymer dispersion is mixed with the inorganic particles and after the polymer primary particles are uniformly mixed with the inorganic particles, and an electrolyte or inorganic salt is added to the mixture, is not limited to a specific type. However, it is preferable to use a device which is equipped with a stirring means such as propeller blades, turbine blades, paddle blades, shell-shaped blades, horseshoe-shaped blades or spiral-shaped blades, in which the stirring speed can be controlled. The device should have a water-discharge means.

By adding the polymer dispersion, and inorganic particle sol to the above described device and stirring, and then adding electrolyte such as inorganic salt to the mixture and stirring, the colloid particles or/and the inorganic particles are coagulated to create a co-aggregate of polymer and inorganic particles which is then separated from the aqueous medium. The aqueous medium is separated from the co-aggregate and then said co-aggregate is washed with water so as to reduce electrolyte residue to levels suitable for the intended use of the co-aggregate. The separation step is the recovery of the co-aggregate. After washing, the co-aggregate is dried at a temperature below the melting point of the polymer and the below the temperature at which thermal decomposition starts. It is preferable that the temperature at which the co-aggregate is dried is not so high that thermal degradation and thermal decomposition of the polymer will occur, but high enough so that volatile electrolyte and surfactant will be vaporized. Drying conditions should include ventilation adequate to carry volatiles away. The resulting dried co-aggregate is a powder wherein each powder particle contains polymer primary particles and nano-sized inorganic particles uniformly mixed.

The weight of inorganic particles in the mixture of the polymer dispersion and inorganic particle colloid, depending on the intended use of the polymer composition, is preferably 0.1 to 80 wt %, more preferably, 0.3 to 50 wt %, and most preferably, 0.5 to 30 wt %, the balance being the polymer in the dispersion, to total 100% of the combined weights of polymer and inorganic particles. Thus, the co-aggregate and granules, pellets and articles molded therefrom that contain 0.1 to 80 wt % inorganic particles, will contain 99.9 to 20 wt % of the polymer either as primary particles or as polymer matrix obtained therefrom. In the nano polymer composition mixture or polymer nano composite according to this invention, wherein the inorganic particles and primary polymer particles are uniformly dispersed at the nano level, when the composite is heated sufficiently to melt the polymer component, the interfacial area among the nano particles and the resulting polymer matrix is significantly increased compared with that of the conventional polymer compound mixture wherein filler is dispersed at a micro level, that is, where the filler particles are greater than about 1000 nm in size. Therefore, said polymer composition mixture has the advantage that, even though the quantity of inorganic particles added is smaller than that of the conventional polymer composition mixture, the properties of the composite are improved.

One of the characteristics of the polymer composition mixture of the present invention wherein the polymer dispersion is mixed and stirred with the sol where the inorganic particles are dispersed and the polymer primary particles are uniformly mixed with the inorganic particles, which mixture is then coagulated thereby solidifying the uniformly mixed state of the polymer primary particles and the inorganic particles, is that, since the inorganic particles are uniformly dispersed at the nano level, after melting sintering or compression molding (as in a hot press) of the polymer component, the resulting composition viscosity and elasticity are different from those of the conventional polymer mixtures wherein inorganic particles are of a size of several thousands of nanometers or greater.

Concentrated solutions of polymer or molten polymer are typically non-Newtonian fluids and therefore their viscosities are dependent upon shear rate. As shear rate increases, viscosity decreases, and as shear rate decreases, viscosity increases. However, as the shear rate tends towards zero, the viscosity approaches a constant value. This limit value is called "zero shear rate viscosity". This is a most important physical value which indicates the viscosity of a polymer and is an exponential function of the polymer molecular weight.

For example, the melt viscosity of a melt processible fluoropolymer normally approaches a constant value as the shear rate is tends towards zero and shows a Newtonian fluid-like behavior (FIG. 1 (curve A)). Also, the viscosity of the conventional polymer composition mixture wherein fused silica with a particle diameter of about 3000 nm is dispersed in the melt processible fluoropolymer, is greater by a constant factor compared with the melt processible fluoropolymer to which silica is not added. In this case, when the shear rate is decreased, the viscosity approaches a constant value showing a Newtonian fluid-like behavior (FIG. 1(curve B)). However, in the case of the melt processible fluoropolymer composition of the present invention wherein silica with a particle diameter of about 66 nm is uniformly dispersed in the melt processible fluoropolymer, when the shear rate is decreased, the melt viscosity does not approach a constant value. Instead, as the shear rate decreases, the viscosity further increases (FIG. 1 (curve C) and (curve D)).

It is believed that the viscosity of the polymer composition mixture of the present invention continues to increase when the shear rate is decreased because the activity of the surface of the nano particles is significantly increased and at the same time the interfacial area among the nano particles and the polymer matrix is significantly increased, and the distance among the nano particles wherein nano particles are uniformly dispersed becomes shorter than is the case for conventional polymer composition mixtures wherein filler is dispersed at the micron level, i.e. >1000 nm. Silica with a particle diameter of 70 nm completely nano-dispersed in the polymer has a surface area of silica or alternatively, an interfacial area with the polymer, of about 400 times greater than the same weight of silica having a particle diameter of about 30000 nm.

The above described significant increase of the activity of the surface of the nano particles and their surface area or interfacial area is the characteristic of the polymer nano composite wherein inorganic particles are dispersed at the nano level in the polymer and is believed to be the reason why properties are improved even though a smaller amount of the inorganic particles is used than would be the case for a conventional polymer composition mixture. For example, in the melt processible fluoropolymer composition mixture wherein the inorganic nano particles of the present invention are uniformly dispersed at the nano level, as the shear rate decreases, the viscosity continues to increase. Therefore, the composition is especially suitable for use as insulation for electric wire. Such insulation, when exposed to high heat, as in a fire, is less likely than conventional compositions to drip. This is because of the viscosity-enhancing effect at low shear, such as the shear force of gravity, of the nano particle filler. Reduced dripping is desirable because drops of molten polymer are hazardous, capable for example of causing smoke and propagating fire.

Furthermore, the dispersive state of the nano particles in the polymer can be directly observed by an electron scanning microscope (SEM) or transmission electron microscope (TEM). It is necessary use higher magnification with the nano particles than with convention fillers, and therefore only the small local areas can be observed. As a result, it is difficult to examine the dispersive state of all the nano particles in a sample. However, by examining changes of the viscosity as the shear rate is increased, it is also possible to indirectly evaluate the dispersive state of the nano particles.

In the case of the melt processible fluoropolymer composition which is obtained by mixing and stirring the polymer dispersion with the inorganic particle sol wherein the inorganic particles are dispersed, and then coagulating to obtain co-aggregate, followed by melting sintering or compression molding of the polymer component, the melt viscosity is observed to vary with shear rate. The increase in melt viscosity with decreasing shear is preferably characterized by the ratio ($V_{0.1}/V_1$) of the melt viscosity ($V_{0.1}$) at 0.1 rad/sec to melt viscosity ($V_1$) at 1 rad/sec, viscosity being measured at 340° C. using the parallel-plate mode of a dynamic viscosity and elasticity measuring device. Depending on the relative amounts of the polymer primary particles and the inorganic particles, and the particle diameter of the inorganic particles, the ratio $V_{0.1}/V_1$ is preferably 1.4 or more, or preferably, 1.5 or more, or more preferably, 2.0 or more.

In considering the ratio ($D_{inorganic}/D_{polymer}$) of the diameter of the inorganic particle ($D_{inorganic}$), to the polymer primary particle ($D_{polymer}$), when the mass of polymer in the composition is greater than that of inorganic material, the ratio ($D_{inorganic}/D_{polymer}$) is preferably about 0.1 or greater, more preferably no less than about 0.2, and most preferably no less than about 0.35. The ratio should not exceed 2.0. If the particle diameter of the inorganic particles is too small relative to the diameter of the primary polymer particle, the large polymer particles cannot cover or enclose (surround) the small inorganic particles during coagulation, and the inorganic particles thus tend to form their own large aggregates after coagulation, rather than forming co-aggregate. In addition, if the diameter of the inorganic particles is too large, the inorganic particles tend to settle under the influence of gravity. This can be a problem for the sol itself, and when the inorganic particle sol is mixed with the polymer dispersion. The same ratios are suitable for the case when the mass of polymer in the composition is greater than that of inorganic material.

According to the present invention, the co-aggregate of particles wherein the polymer primary particles and inorganic particles obtained in the above described drying process, are uniformly dispersed, can be melt-processed using known extrusion-molding methods, injecting-molding methods, compression molding methods, and transfer-molding methods. Such processing is preferably done after the co-aggregate is pelletized, preferably in a melt extruder. Of course, the co-aggregate if not pelletized can be directly used in molding, or pelletized by compacting to improve feeding to the molding machine hopper. Also, the co-aggregate of the particles wherein the polymer primary particles and inorganic particles obtained in the present invention are uniformly dispersed, can be further granulated and used as the material for a powder molding, powder coating and rotomolding, which includes rotolining. One way in which such granulation can be achieved by post-coagulation addition of a water-immiscible solvent, as described in U.S. Pat. No. 4,675,380.

The co-aggregate, particularly the pelletized co-aggregate, may be used as a "concentrate" to be blended with additional compatible polymer. The resulting blend will have a lower concentration of filler, such as silica, if a silica sol is used in making the co-aggregate. By using co-aggregate as concentrate, it is not necessary to make co-aggregate for each polymer composite needed. The concentrate can be blended, preferably melt blended, if desired by first dry blending, such as dry blending of pellets of the composition with pellets of polymer, to give the desired concentration of filler in the finished article.

Furthermore, when the co-aggregate is pelletized by using an extruder, it is preferable to use a twin-screw extruder because of its superior shearing force. Also, during the process of pelletizing the co-aggregate in the extruder, it is possible to add additive(s) or to blend in other polymer(s). The addition of an additive can be done not only during the melt-extruding process but also during the process where the above described polymer dispersion and inorganic particle sol is mixed. Examples of additives include glass fiber, carbon fiber, aramide fiber, graphite, carbon black, mica, clay, fullerene, carbon nano tubes and carbon nano fiber.

Because the particles are uniformly dispersed at the nano level in the polymer, the final molded product can be used in a variety of areas to improve properties. Examples of such molded product include tubes, sheets, films, rods, fabrics, fibers, packing, lining, seal rings, electric wire insulation, and film and print substrate. The polymer composition in which the polymer itself is transparent and in which the uniformly dispersed inorganic are either small, or present in small amount, or both, is also transparent. The inorganic nanoparticles are from 1 to 200 nm in size and are resent in concentrations of from 0.1 to 40 wt % based on the combined weights of polymer and inorganic particles. Such compositions are useful for a variety of purposes such as a film for anti-reflective coatings, anti-scratch film, optical fibers, transparent film, transparent tubes and electric material. Furthermore, since the particles are uniformly dispersed in the polymer and the shear rate is significantly decreased, the zero shear rate viscosity is significantly increased compared to the case where the particles are not dispersed at the nano level. Therefore, the present invention can be also used for polymer products such as an electric wire insulation because of increased resistance of the insulation to drip at high heat, such as in a fire, because of the polymer high viscosity under the low shear of gravity. This antidrip property is beneficial because it reduces the danger of dripping of the molten polymer under fire conditions.

EXAMPLES

Example 1

The present invention is described in detail in the following Examples, which are not intended to be limiting.
(A. Measurement of the Properties)
(1) Melting Point (melting peak temperature)
A differential scanning calorimeter (Pyris 1 type DSC, made by Perkin Elmer Co.) is used. About 10 mg of sample is weighed and placed in an aluminum pan, which is then crimped. The crimped pan is placed in the DSC and the temperature is increased from 150° C. to 360° C. at 10° C./minute. The melting peak temperature (Tm) is obtained from the melting curve which is obtained in the above described process, being the maximum of the endotherm.
(2) Melt Flow Rate (MFR)
Using a melt indexer (made by Toyo Seiki Co.) equipped with corrosion resistant cylinder, die and piston which complies with ASTM D-1238-95, 5 g of sample powder is put into the cylinder which is kept at 372±1° C. and maintained for 5 minutes. After that, the sample is extruded through a die orifice under 5 kg of load (piston plus weight) and the extrusion rate (g/10 minute) is the MFR. For PTFE, the molecular weight is too high to conduct a normal melt-extruding operation, therefore the melt flow rate is not measured.
(3) Particle Diameter
The particle diameter of the polymer primary particles in the fluoropolymer dispersion and of the silica particles in the silica sol is obtained as follows: the concentration of the fluoropolymer dispersion or silica sol is diluted to 5 wt % by adding pure (deionized or distilled) water, and dried. Then, the particles on the surface of the dried samples are observed by an electron microscope and the average particle diameters are obtained.

(4) Silica Dispersive State in the Polymer Matrix

A sheet having a thickness of about 200 μm is made by melt-compression-molding at 350° C. fluoropolymer composition of the invention. Sample pieces 10 mm×10 mm are cut from three sections of the sheet. Using an optical microscope (made by Nikon Co., OPTIPHOTO 2-POL), the dispersive state of the particles, that is, whether or not there are aggregates of silica nano particles of 1000 nm or more, is observed.

Samples in which the silica nano particles of 1000 nm or more are observed, are placed in liquid nitrogen and fractured to expose cross-sectional surfaces. The exposed surfaces of three samples are observed by electron microscope to evaluate the dispersive state of silica. The case where almost all of the silica is dispersed as primary particles is expressed by ⊚. The case where only less than about 5% of the silica nano particles are aggregated to greater than 1000 nm are observed is expressed by ○. The case where a 20% or more of the silica nano particles are aggregated to greater than 1000 nm is expressed by x.

(5) Zero Shear Rate Viscosity

Sample pieces with a diameter of 25 mm are made from compression-molded (350° C.) sheet about 1.5 mm thick. Using a 25 mm-parallel plate in an ARES viscosity and elasticity measuring device made by Rheometric Scientific Corporation (UK), the melt viscosity is measured at 340° C. over an oscillation frequency (shear rate) of 100 to 0.1 rad/sec, and the ratio ($V_{0.1}/V_1$) of the melt viscosity ($V_{0.1}$) at 0.1 rad/sec to the melt viscosity ($V_1$) at 1 rad/sec is calculated.

(6) Storage Elastic Modulus

Sample pieces of 12 mm×45 mm×1.5 mm are made from a compression-molded (350° C.) sheet of about 1.5 mm thick. Using an ARES viscosity and elasticity measuring device made by Rheometric Scientific Corporation, the storage elastic modulus is measured in torsion mode at 1 Hz from −40° C. to 200° C. at a heating rate of 5° C./minute.

(B. Materials)

The starting materials used in the examples of the present invention and the comparative examples are described:

(1) PFA Emulsion

Made by DuPont Mitsui Fluorochemical Co. PFA aqueous dispersion is obtained by emulsion polymerization. Polymer solids: 30 wt %; average particle diameter of the PFA primary particles: 200 nm; pH 9; melting point: 309° C.; and melt flow rate: 2 g/10 min.

(2) Pelletized PFA (melting point: 309° C.; and melt flow rate: 2 g/10 minutes)

(3) PTFE Emulsion (polymer solids: 50 wt %; average particle diameter of the primary particles: 210 nm; pH 9; and melting point: 326° C.)

(4) Silica Sol (a) Made by Nissan Chemical Corporation, Snowtex MP2040 (silica: 40 wt %; silica primary particle diameter: 190 nm; and pH 9.5)

(b) Made by Nissan Chemical Corporation, Snowtex MP1040

(silica: 40 wt %; silica primary particle diameter: 110 nm; and pH 9.5)

(c) Made by Fuso Chemical Corporation, PL-7

(silica: 23 wt %; silica primary particle diameter: 70 nm; and pH 7.4)

(d) Made by Fuso Chemical Corporation, PL-3

(silica: 20 wt %; silica primary particle diameter: 35 nm; and pH 7.2)

(5) Fused Silica

Made by Denki Kagaku Kogyo, FB-74 (silica average particle diameter: 32000 nm)

Example 1

Figure 3:
FIG. 3 is an electron microscope picture of the cross section obtained by fracture of a compression molding of the polymer composition sample of Example 1.
Figure 4:
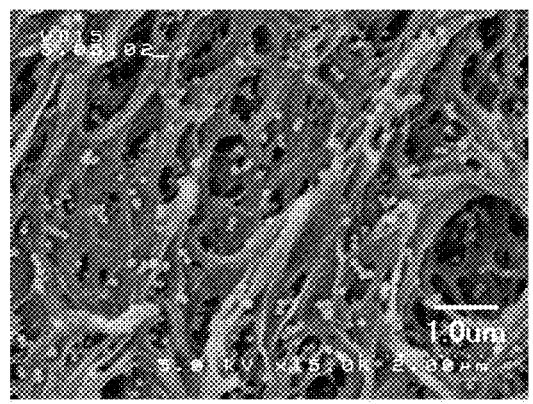
FIG. 4 is an electron microscope picture of the cross section obtained by fracture of a compression molding of the polymer composition sample of Example 4.

Silica sol, 33 g, made by Nissan Chemical Co. (MP-2040), and 1000 g of pure water are placed in a beaker (2 L) which is stirred for 20 minutes at 200 rpm using a stirrer with four-blade down draft-type propeller. Then, 853 g of emulsion polymerized PFA aqueous dispersion is added to the mixture so that the silica content becomes 5 wt % of the combined weight of polymer and silica. After the mixture is stirred for another 20 minutes, 9 ml of 60% aqueous nitric acid is added to the mixture. Said mixture is stirred again until it gels and fluoropolymer primary particles and silica nano particles are coagulated. The coagulated co-aggregate is further stirred for 5 minutes at 350 rpm and then separated from the aqueous medium. After that, the co-aggregate is dried at 150° C. for 10 hours thereby obtaining an co-aggregate in a dried-powder form. The dried co-aggregate powder is compression molded at 350° C., giving a sheet having a thickness of about 1.5 mm. Elasticity and viscosity are measured and the sample is observed by using an optical and electron microscopes. The results are summarized in Table 1 and in FIG. 3.

Example 2

Dried co-aggregate powder is made by the same procedure as that of Example 1 except that the amount of the silica sol and the PFA aqueous dispersion is adjusted so that the silica content is 15 wt %. The dried co-aggregate powder is compression molded at 350° C. and, by using the resulting sheet having a thickness of about 1.5 mm, the elasticity and viscosity are measured. Results are summarized in Table 1.

Example 3

Dried co-aggregate powder is made by the same procedure as that of Example 1 except that the amount of the silica sol and the PFA aqueous dispersion is adjusted so that the silica content is 20 wt %. The dried co-aggregate powder is compression molded at 350° C. and, using the resulting sheet having a thickness of about 1.5 mm, the elasticity and viscosity are measured and the sample is observed by using optical and electron microscopes. The results are summarized in Table 1 and FIG. 1 (curve C).

Example 4

Figure 2:
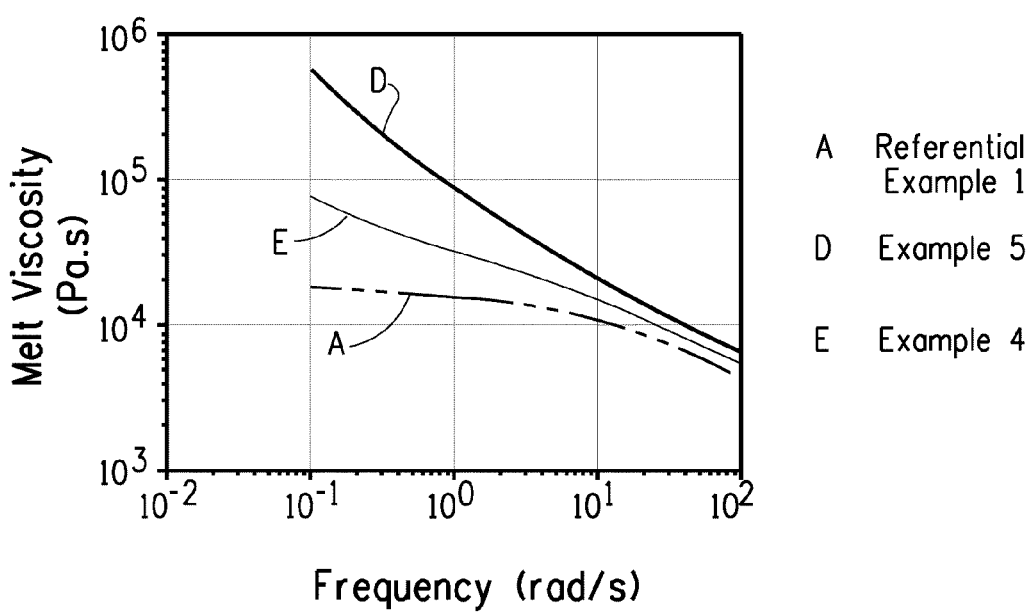
FIG. 2 is a graph of the measurement of the zero shear rate viscosity of the polymer compositions containing 10 wt % and 20 wt % silica from PL-7 silica sol.
Figure 5:
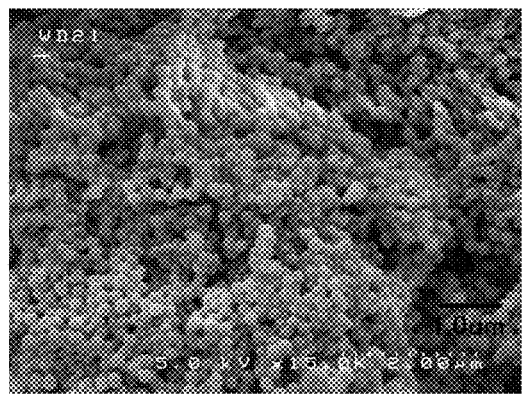
FIG. 5 is an electron microscope picture of the surface of the dried-powder co-aggregate of Example 4.

Dried co-aggregate powder is made by the same procedure as that of Example 1 except that PL-7 is used as the silica sol instead of MP-2040 and the silica content is 10 wt %. The dried co-aggregate powder is compression molded at 350° C. and, using the resulting sheet having a thickness of about 1.5 mm, the elasticity and viscosity are measured and the sample is observed using optical and electron microscopes. The results are summarized in Table 1 and FIGS. 2 (curve E) and 4. Also, to observe the dispersed state of PFA particle and silica particle mixture after coagulation, the dried co-aggregate powder is further dried at 295° C. for 12 hrs before being subjected to observation by electron microscopy. The results are shown in FIG. 5.

Example 5

Dried co-aggregate powder is made by the same procedure as that of Example 4 except that the silica content is 20 wt % (PL-7). The dried co-aggregate powder is compression molded at 350° C. and, using the resulting sheet having a thickness of about 1.5 mm, the elasticity and viscosity are measured and the sample is observed by using optical and electron microscopes. The results are summarized in Table 1 and FIGS. 1 (curve D) and 2 (curve D).

Example 6

Dried co-aggregate powder is made by the same procedure as that of Example 1 except that PL-3 is used as the silica sol instead of MP-2040 and the silica content is 20 wt %. The dried co-aggregate powder is compression molded at 350° C. and, using the resulting sheet having a thickness of about 1.5 mm, the elasticity and viscosity are measured and the sample is observed by using optical and electron microscopes. The results are summarized in Table 1.

Example 7

Figure 6:
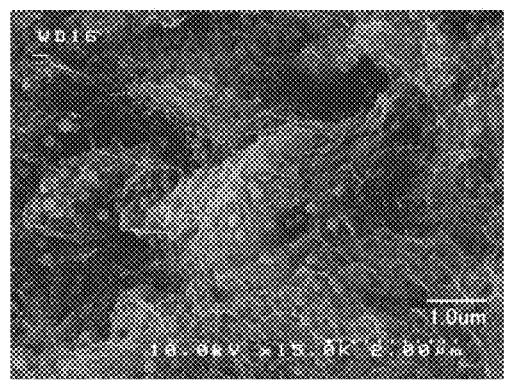
FIG. 6 is an electron microscope picture of the cross section obtained by fracture of a compression molding of the polymer composition sample of Example 7.

This Example uses PTFE that cannot be melt-processed. The dried co-aggregate powder is made by the same procedure as that of Example 1 except that PTFE aqueous dispersion is used instead of PFA dispersion. The PTFE dispersion is diluted with pure water to a solids concentration of 30 wt %. The silica content is 5 wt %. The melt viscosity of the PTFE is extremely high, so the viscosity is not measured. The dried co-aggregate powder is compression molded at 350° and, using the resulting sheet having a thickness of about 1.5 mm, the elasticity is measured and the sample is observed by using optical and electron microscopes. Because of the high viscosity of PTFE, viscosity is not measured. The results are summarized in Table 1 and FIG. 6.

Comparative Example 1

Fused silica with an average particle diameter of 32000 nm is melt-mixed with pelletized PFA pellet using an R-60 melt-mixer (made by Toyo Seiki Co.) at 340° C. at 100 rpm for 5 minutes. This process gives a conventional composition wherein silica with an average particle diameter of 32000 nm is dispersed in the melt processable fluoropolymer is obtained. The silica content is 20 wt %. The resulting sample is compression molded at 350° C. and, using the resulting sheet having a thickness of about 1.5 mm, the elasticity and viscosity are measured and the sample is observed by using an optical and electron microscopes. The results are summarized in Table 1 and FIG. 1 (curve B).

Comparative Example 2

Figure 7:
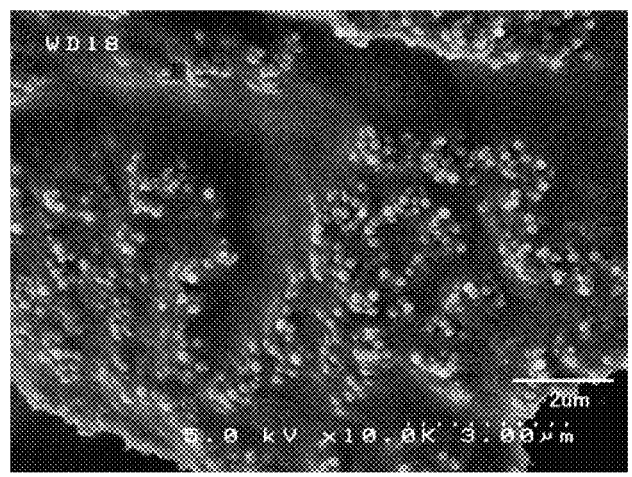
FIG. 7 is an electron microscope picture of the surface a coating of the polymer composition sample of in Comparative Example 2.

In this example film is made by directly coating the solution of fluoropolymer aqueous dispersion mixed with silica sol on a substrate. The mixed dispersion and sol is not coagulated. Silica sol, 33 g, made by Nissan Chemical Co. (MP-1040) and 1000 g of pure water are placed into a beaker (2 L) which is stirred for 20 minutes at 200 rpm by using a down flow-type propeller four-blade stirring machine. PFA aqueous dispersion, 853 g, made by emulsion polymerization, is added to the mixture so that a mixture having weight ratio of PFA to silica of 95/5 is obtained. This mixture is then stirred for another 20 min. As a result, a solution of fluoropolymer dispersion mixed with silica sol is obtained. The silica content is 5 wt %. The mixed solution is directly spray-coated on an aluminum plate which is dried at 120° C. for 30 minutes and sintered at 350° C. for 15 minutes, thereby obtaining a coated product with a coating thickness of about 50 μm. The surface of the coating product is observed by optical and electron microscopes and the results are summarized in Table 1 and FIG. 7.

Comparative Example 3

Figure 8:
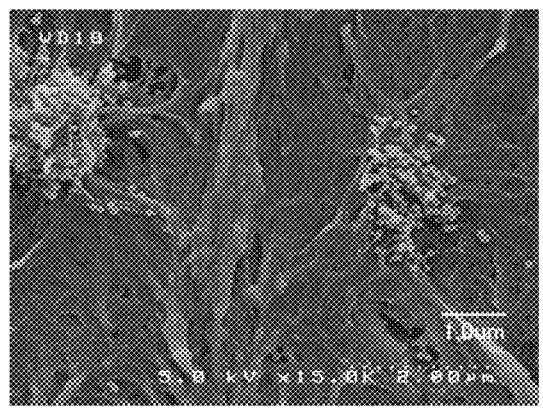
FIG. 8 is an electron microscope picture of the cross section obtained by fracture of a compression molding of the polymer composition sample of Comparative Example 3.

In this example the mixed solution of the fluoropolymer dispersion and silica sol is dried without being coagulated. Using the same method as in Example 4 except that MP-1040 is used as the silica sol instead of MP2040, a mixed solution of the fluoropolymer aqueous dispersion and silica sol wherein the silica content is 10 wt %, is obtained. The mixed solution is dried at 80° C. for 12 hours thereby creating dried powder. The obtained dried co-aggregate powder is compression molded at 350° C. and, using the resulting sheet having a thickness of about 1.5 mm, the elasticity and viscosity are measured and the sample is observed by using optical and electron microscopes. The results are summarized in Table 1 and FIG. 8.

Reference Example 1

The properties of the melt processable fluoropolymer itself, that is without added silica or other filler, are summarized in Table 1 and FIGS. 1 (curve A) and 2 (curve A).

Summary of Results from Examples

In Examples 1 to 3, the silica nano particles are completely nano-dispersed in the melt processable fluoropolymer matrix. Due to the nano-dispersed silica, the viscosity ratio ($V_{0.1}/V_1$) is higher than that of the pure melt processable fluoropolymer (Reference Example 1). As the silica content is increased, the viscosity ratio ($V_{0.1}/V_1$) is increased. Also, as the amount of silica is increased, the storage elastic modulus is increased.

In Examples 4 and 5, the silica nano particles are completely nano-dispersed in the melt processable fluoropolymer matrix. Also, comparing the samples with silica is 20 wt % silica content, the viscosity ratio ($V_{0.1}/V_1$) is greater for Example 5 where the particle diameter of silica is smaller than that of Example 3. Especially, in Example 5, aggregates of silica particles are not observed on the surface of the mixture wherein the PFA primary particles (average particle diameter: about 200 nm) and the silica particles (average particle diameter: about 70 nm) are coagulated before the dried co-aggregate powder is compression molded.

It is seen in Example 6, even in the case where the particle diameter of silica is 35 nm, the silica nano particles are completely nano-dispersed in the melt processable fluoropolymer matrix. Also, the aggregate made of silica nano particles with a size of 1000 nm or more is not observed by an optical microscope. However, a few aggregates with a size of about several hundreds nm made of silica nano particles with a particle diameter of 35 nm are observed by an electron microscope at 20000-fold magnification. Furthermore, the viscosity ratio ($V_{0.1}/V_1$) is almost the same as that of Example 5 wherein the particle diameter is 70 nm and the silica content is also 20%.

TABLE 1

| | Fluoropolymer volume (%) | | Silica | | | |
|---|---|---|---|---|---|---|
| | PFA | PTFE | Weight (%) | Type | Primary particle diameter (nm) | $D_{inorganic}/D_{polymer}$ |
| Example 1 | 95 | — | 5 | MP-2040 | 190 | 0.95 |
| Example 2 | 85 | — | 15 | MP-2040 | 190 | 0.95 |
| Example 3 | 80 | — | 20 | MP-2040 | 190 | 0.95 |
| Example 4 | 90 | — | 10 | PL-7 | 70 | 0.35 |
| Example 5 | 80 | — | 20 | PL-7 | 70 | 0.35 |
| Example 6 | 80 | — | 20 | PL-3 | 35 | 0.175 |
| Example 7 | — | 95 | 5 | MP-2040 | 190 | 0.95 |
| Comparative Example 1 | 80 | — | 20 | FB-74 | (32000) | — |
| Comparative Example 2 | 95 | — | 5 | MP-1040 | 110 | 0.55 |
| Comparative Example 3 | 90 | — | 10 | MP-1040 | 110 | 0.55 |
| Referential Example 1 | 100 | — | — | — | — | — |

| | Properties of the composition | | | | | | |
|---|---|---|---|---|---|---|---|
| | Storage elastic modulus (Pa) | | | $V_{0.1}$ | $V_1$ | | Silica dispersive |
| | 25° C. | 100° C. | 200° C. | (Pa·s) | (Pa·s) | $V_{0.1}/V_1$ | state |
| Example 1 | 3.10E+08 | 1.00E+08 | 4.00E+07 | 31020 | 20110 | 1.54 | ⊚ |
| Example 2 | 4.50E+08 | 1.60E+08 | 6.90E+07 | 79837 | 39388 | 2.03 | ⊚ |
| Example 3 | 6.10E+08 | 2.50E+08 | 1.10E+08 | 195070 | 62233 | 3.13 | ⊚ |
| Example 4 | 4.20E+08 | 1.40E+08 | 6.00E+07 | 80544 | 36946 | 2.18 | ⊚ |
| Example 5 | 6.40E+08 | 2.80E+08 | 1.40E+08 | 455840 | 91241 | 5.00 | ○ |
| Example 6 | 6.60E+08 | 3.20E+08 | 1.60E+08 | 1063700 | 156200 | 6.81 | ○ |
| Example 7 | Not measured | | | Not measured | | | ⊚ |
| Comparative Example 1 | 3.80E+08 | 1.20E+08 | 4.30E+07 | 39331 | 34553 | 1.14 | X |
| Comparative Example 2 | Not measured | | | Not measured | | | X |
| Comparative Example 3 | 3.30E+08 | 1.20E+08 | 4.50E+07 | 24048 | 17813 | 1.35 | X |
| Reference Example 1 | 2.40E+08 | 7.30E+07 | 2.80E+07 | 20864 | 18090 | 1.15 | na |

Note:
"na" means not applicable

In Examples 3, 5 and 6, when the silica content is 20 wt %, as the particle diameter of silica decreases, the storage elastic modulus increases. In Example 7, since the melt viscosity of PTFE is very high, it is not practical to mix additives or nanoparticles with PTFE by melt-mixing. The present invention offers a way to uniformly disperse silica nanoparticles in the PTFE matrix.

Comparative Example 1 is the conventional polymer composition wherein silica with an average particle diameter of 32000 nm is dispersed in the melt processable fluoropolymer. The viscosity ratio ($V_{0.1}/V_1$) is almost the same as that of the melt processable fluoropolymer without silica. This is because silica is not nano-dispersed and is not effective in changing the viscosity ratio from that of the melt processable fluoropolymer alone.

In Comparative Example 2 a film is made by directly coating a substrate with the solution resulting from mixing of fluoropolymer dispersion with silica sol. The co-aggregation step, e.g. coagulation with electrolyte, is omitted. Because there is no co-aggregation during the drying of the mixed solution, the fluoropolymer primary particles and silica nano particles separate and cluster and the silica nano particles similarly cluster to a size of several micrometers, seen on the surface of the film after sintering.

The transparency of the polymer compositions of the Examples were determined, using pieces 50 mm×50 mm made from compression-molded (350° C.) sheet about 1 mm thick. Using a Haze-meter NDH2000 (Nippon Denshoku, Japan) equipped with a halogen lamp D65, the optical transmittance of the samples were measured. The averaged values of optical transmittance were calculated from results of three sample pieces. Transmittances of 50% or greater appear transparent to the naked eye.

Example 1 PFA with 5 wt % 190 nm silica had a transmittance of 50%. Examples 2 and 3 with 15 and 20 wt % respectively of 190 nm silica had transmittance of 30 and 20%, showing that 190 nm particles affect transparency only at higher loadings. Examples 4 and 5 are PFA with 70 nm silica at loadings of 10 and 20 wt % respectively have high transmittance of 72 and 70%, showing that the smaller particles can be used at higher loadings without interfering with transparency. Example 6 is PFA with a 20 wt % loading of 35 nm silica and has 70% transmittance. In Example 7, PTFE with 5% loading of 190 nm silica, i.e. the same loading of the same sized silica as Example 1, has low transmittance, 10%. This is the effect of the PTFE polymer, which being highly crystalline, has low transparency, the crystals scattering light.

In conclusion, it is found that without co-aggregating it is not possible to nano-disperse silica. To nano-disperse silica, it is necessary to coagulate the mixed solution of the fluoropolymer aqueous dispersion and silica sol and solidify the uniformly mixed state of the polymer primary particles and inorganic particle. In Comparative Example 3, the mixed solution of the fluoropolymer aqueous dispersion and silica sol is not coagulated but rather directly dried. The result is the clustering of the silica nano particles (aggregation of silica particles with each other).

According to the present invention, polymer dispersion wherein polymer primary particles are surrounded by a surfactant and stably dispersed in the solvent, such as by emulsion polymerization, is mixed and stirred with a colloid solution and said inorganic particles are stably dispersed by a repulsive force among the inorganic particles. It is not necessary to surface-treat the inorganic particles. After the polymer primary particles and inorganic particles are uniformly mixed, then coagulated by strong shearing using a mixer, by adding an electrolyte, or by freezing the dispersion. As a result, the stability of the polymer dispersion and that of the inorganic particle colloid solution is decreased thereby coagulating the particles. As a result, the uniformly mixed state of the polymer primary particles and the inorganic particles is solidified. Then, by separating the co-aggregated particles from the solvent and drying, it is possible to obtain the polymer composition wherein the inorganic particles are intimately mixed at the nano level with the polymer particles. Therefore, the present invention can be used for a variety of fields which benefit when the inorganic particles are uniformly dispersed at the nano level in polymer.

Furthermore, when the particles are uniformly dispersed in the molten polymer and the shear rate is significantly decreased, the zero shear rate viscosity is significantly increased compared with the case where the inorganic particles are not dispersed at the nano level. Therefore, the present invention can be also used for a polymer product such as an electric wire insulation because of increased resistance of the insulation to drip at high heat, such as in a fire, because of the polymer's high viscosity under the low shear of gravity. This antidrip property is beneficial because it reduces the danger of dripping molten polymer under fire conditions.

What is claimed is:

1. A method for making a polymer composition, comprising mixing aqueous polymer dispersion comprising polymer primary particles with an aqueous colloidal solution of spherical inorganic particles having an average diameter of 10 to 300 nm, said inorganic particles being hydrophilic, stabilized, not surface-treated, and stably dispersed in said solution, the ratio ($D_{inorganic}/D_{polymer}$) of the average particle diameter ($D_{inorganic}$) of said inorganic particles to the average primary particle diameter ($D_{polymer}$) of said polymer primary particles being 0.1 to 2.0, wherein said inorganic particles are present in 0.1 to 40 wt % based on the combined weight of said polymer and said inorganic particles, coagulating the resultant mixture by the addition of electrolyte, wherein said electrolyte is in the form of an aqueous solution and the amount of said electrolyte is from 0.02 to 10 weight percent based on the combined weight of said electrolyte and said polymer, to make a co-aggregate of the polymer primary particles with said inorganic particles, separating said co-aggregate, and drying said co-aggregate.

2. The method of claim 1, wherein said inorganic particles of said colloidal solution are selected from at least one of the group consisting of silicon oxide, titanium oxide, aluminum oxide, and zinc antimonate.

3. The method of claim 1, wherein the polymer of said polymer dispersion is a polymer or copolymer of monomers which are selected from the group consisting of tetrafluoroethylene, hexafluoropropylene, chlorotrifluoroethylene, perfluoro(alkyl vinyl ether), vinylidene fluoride and vinyl fluoride, or a copolymer of ethylene or propylene with at least one of the monomers selected from the group consisting of tetrafluoroethylene, hexafluoropropylene, chlorotrifluoroethylene, perfluoro(alkyl vinyl ether), vinylidene fluoride and vinyl fluoride.

4. The method of claim 1, further comprising melt processing said composition as said co-aggregate, or as granules or pellets of said co-aggregate.

5. The method of claim 1, further comprising compression molding said composition as said co-aggregate, or as granules of said co-aggregate.

6. The method of claim 1 wherein the ratio ($V_{0.1}/V_1$) of the melt viscosity ($V_{0.1}$) at 0.1 rad/sec to the melt viscosity ($V_1$) at 1 rad/sec of said polymer composition is 1.4 or greater, said melt viscosities being measured at 340° C. by the parallel-plate mode of a dynamic viscosity and elasticity measuring device.

7. The method of claim 1, wherein the storage elastic modulus at 200° C. of said polymer composition is greater than 1.7 times than that of said polymer itself.

* * * * *